US009814050B2

(12) United States Patent
Tavildar et al.

(10) Patent No.: US 9,814,050 B2
(45) Date of Patent: Nov. 7, 2017

(54) SYSTEMS AND METHODS FOR PERFORMING NETWORK CONFIGURABLE ACCESS AND DATA TRANSFER PROCEDURES

(71) Applicant: QUALCOMM Incorporated, San Diego, CA (US)

(72) Inventors: Saurabha Tavildar, Jensey City, NJ (US); Wei Zeng, San Diego, CA (US); Joseph Binamira Soriaga, San Diego, CA (US)

( * ) Notice: Subject to any disclaimer, the term of this patent is extended or adjusted under 35 U.S.C. 154(b) by 88 days.

(21) Appl. No.: 15/089,412

(22) Filed: Apr. 1, 2016

(65) Prior Publication Data
US 2017/0156136 A1 Jun. 1, 2017

Related U.S. Application Data (60) Provisional application No. 62/261,080, filed on Nov. 30, 2015.

(51) Int. Cl.
*H04W 72/04* (2009.01)
*H04W 74/08* (2009.01)

(52) U.S. Cl.
CPC ..... *H04W 72/048* (2013.01); *H04W 72/0406* (2013.01); *H04W 74/0833* (2013.01)

(58) Field of Classification Search
None
See application file for complete search history.

(56) References Cited

U.S. PATENT DOCUMENTS

| 8,787,340 | B2 | 7/2014 | Chen et al. | |
|---|---|---|---|---|
| 2008/0247379 | A1* | 10/2008 | Belanger | H04L 12/2856 370/351 |
| 2011/0158090 | A1* | 6/2011 | Riley | H04L 12/14 370/230 |
| 2012/0178456 | A1* | 7/2012 | Peisa | H04W 8/245 455/436 |
| 2014/0031023 | A1 | 1/2014 | Schraut et al. | |
| 2015/0063305 | A1 | 3/2015 | Kim et al. | |

(Continued)

OTHER PUBLICATIONS

International Search Report and Written Opinion issued for PCT/US2016/055309 dated Jan. 4, 2017, 11 pages.

*Primary Examiner* — Chi H Pham
*Assistant Examiner* — Soon-Dong D Hyun
(74) *Attorney, Agent, or Firm* — Qualcomm IP Dept.; James Hunt Yancey, Jr.

(57) ABSTRACT

Mobile originated and terminated data transmissions are discussed. Communication devices such as user equipment (UE) can be dynamically configured by a network to send and receive data. When a UE connects to a new network, the network can determine mobility of the UE and/or the network resource allocation granularity. Based at least on the network's determinations, the UE can be configured such that access data having a comparatively long life span is used and reused for multiple data transmissions. In some scenarios, access data can be refreshed after expiration of a period of time. Refresh time can be equal to expected life span of reusable access data. After UE configuration, the UE performs mobile originated and terminated data transmissions according to the configuration. Other aspects, embodiments, and features are also claimed and described.

26 Claims, 6 Drawing Sheets

(56) References Cited

U.S. PATENT DOCUMENTS

| | | |
|---|---|---|
| 2015/0105116 A1 | 4/2015 | Schmidt et al. |
| 2015/0271665 A1 | 9/2015 | Löwenmark et al. |
| 2015/0327139 A1* | 11/2015 | Sirotkin ............... H04W 36/30 370/332 |
| 2015/0350959 A1 | 12/2015 | Yang et al. |
| 2016/0212690 A1* | 7/2016 | Ukil .................... H04W 48/16 |
| 2017/0142691 A1* | 5/2017 | Sirotkin ............. H04W 72/042 |

* cited by examiner

SYSTEMS AND METHODS FOR PERFORMING NETWORK CONFIGURABLE ACCESS AND DATA TRANSFER PROCEDURES

CROSS-REFERENCE TO RELATED APPLICATIONS

This application claims the benefit of and priority to U.S. Provisional Patent Application No. 62/261,080 entitled, "SYSTEMS AND METHODS FOR PERFORMING NETWORK CONFIGURABLE ACCESS AND DATA TRANSFER PROCEDURES," filed on Nov. 30, 2015, the disclosure of which is hereby incorporated herein by reference as if fully set forth below in its entirety and for all applicable purposes.

TECHNICAL FIELD

Aspects of the present disclosure relate generally to wireless communication systems, and more particularly, to wireless networks operable to configure access procedures and data transfer procedures.

INTRODUCTION

A wireless communication network may include a number of base stations or node Bs that can support communication for a number of user equipments (UEs). A UE may communicate with a base station via downlink (DL) and uplink (UL). The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

With the growing demand for mobile broadband access comes an increase in communications between an eNB and a UE. Traditionally, a UE is not constantly connected with an eNB because a constant connection would waste network bandwidth and UE battery life. As such, every time a disconnected UE desires to send or receive data from the network, a series of specific steps and communications between the eNB and the UE are performed in order to setup a two way connection between the UE and eNB before the desired data is transmitted. This process has traditionally been called the Random Access Procedure (RAP).

RAP involves a great number of setup steps before a connection is established and data is transmitted. Traditionally, all of the mobile originated (MO) data transmission steps are performed before each MO transmission, and every mobile terminated (MT) transmission step is performed before every MT transmission. Typically, all of the setup steps are repeated a multitude of times throughout an hour tying up a considerable about of network bandwidth and UE battery life. Further, because these steps are repeated for each transmission, the setup steps increase data latency.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for transmitting data comprises receiving UE access data and saving at least a portion of the UE access data. Subsequent to the saving, determining that data is to be transferred and utilizing at least a portion of the previously saved UE access data to send more than one data transmission, wherein the more than one data transmissions are sent at different times.

In an additional aspect of the disclosure, a method for receiving data comprises determining that the network desires to send data, receiving the data, and utilizing previously saved UE access data to decode the received data. The method may further comprise refreshing the previously saved access data based on a determination that a predetermined time period has expired.

In an additional aspect of the disclosure, a method of configuring a UE comprises determining whether the UE is mobile, determining a resource allocation granularity of a network serving the UE, and configuring the UE's method of transmitting data based at least on the mobility determination and the resource allocation granularity determination. In embodiments wherein the mobility determination determines that the UE is a non-mobile UE, the method may further comprise setting a predetermined period of time to be less than or equal to an expected life span of UE access data, and configuring the UE to transmit data according to the following steps: receiving the UE access data, saving at least a portion of the UE access data, subsequent to the saving, determining that data is to be transferred, and utilizing at least a portion of the previously saved UE access data to transmit more than one data transmission.

In an additional aspect of the disclosure, a system for transmitting data comprises means for receiving UE access data, means for saving at least a portion of the UE access data, subsequent to the saving, means for determining that data is to be transferred, and means for utilizing at least a portion of the previously saved UE access data to send more than one data transmission, wherein the more than one data transmissions are sent at different times.

In an additional aspect of the disclosure, a system for receiving data comprises means for determining that the network desires to send data, means for receiving the data, means for utilizing previously saved UE access data to decode the received data, and means for refreshing the previously saved access data based on a determination that a predetermined time period has expired.

In an additional aspect of the disclosure, a system for configuring a UE's transmission procedure comprises means for determining whether the UE is mobile, means for determining a resource allocation granularity of a network serving the UE, and means for configuring the UE's transmission procedure based at least on the mobility determination and the resource allocation granularity determination. In embodiments wherein the mobility determination determines that the UE is a non-mobile UE, the system may further comprise means for setting a predetermined period of time to be less than or equal to an expected life span of UE access data, and configuring the UE to transmit data according to the following steps: receiving the UE access data, saving at least a portion of the UE access data, subsequent to the saving, determining that data is to be transferred, and utilizing at least a portion of the previously saved UE access data to transmit more than one data transmission.

In an additional aspect of the disclosure, a system for transmitting data comprises a UE operable to receive UE access data and save at least a portion of the UE access data. Subsequent to the saving, the UE is further operable to determine that data is to be transferred and utilizes at least a portion of the previously saved UE access data to send more than one data transmission, wherein the more than one data transmissions are sent at different times.

In an additional aspect of the disclosure, a system for receiving data comprises a UE operable to determine that a network desires to send data and further operable to receive the data, wherein the UE utilizes previously saved UE access data to decode the received data. Further, the UE refreshes the previously saved access data based on a determination that a predetermined time period has expired.

In an additional aspect of the disclosure, a system for configuring a UE's transmission procedures comprises a network computer operable to determine whether the UE is mobile and determine a resource allocation granularity of a network serving the UE, wherein the UE's transmission procedures are configured based at least on the mobility determination and the resource allocation granularity determination. In embodiments wherein the mobility determination determines that the UE is a non-mobile UE, the network computer is further configured to set a predetermined period of time to be less than or equal to an expected life span of UE access data, and configure the UE to transmit data according to the following steps: receiving the UE access data, saving at least a portion of the UE access data, subsequent to the saving, determining that data is to be transferred, and utilizing at least a portion of the previously saved UE access data to transmit more than one data transmission.

In an additional aspect of the disclosure, a non-transitory computer-readable medium having program code recorded thereon, wherein the program code comprises program code for causing a UE to receive UE access data, program code for causing the UE to save at least a portion of the UE access data, program code for causing the UE to determine, subsequent to the saving, that data is to be transferred, and program code for causing the UE to utilize at least a portion of the previously saved UE access data to send more than one data transmission, wherein the more than one data transmissions are sent at different times.

In an additional aspect of the disclosure, a non-transitory computer-readable medium having program code recorded thereon, wherein the program code comprises program code for causing a UE to determine that the network desires to send data, program code for causing a UE to receive the data, and program code for causing a UE to utilize previously saved UE access data to decode the received data, wherein the previously saved access data is refreshed when a predetermined time period has expired.

In an additional aspect of the disclosure, a non-transitory computer-readable medium having program code recorded thereon, wherein the program code comprises program code for causing a network computer to determine whether a UE is mobile, program code for causing a network computer to determine a resource allocation granularity of a network serving the UE, and program code for causing a network computer to configure the UE's transmission procedure based at least on the mobility determination and the resource allocation granularity determination.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Figure 1:
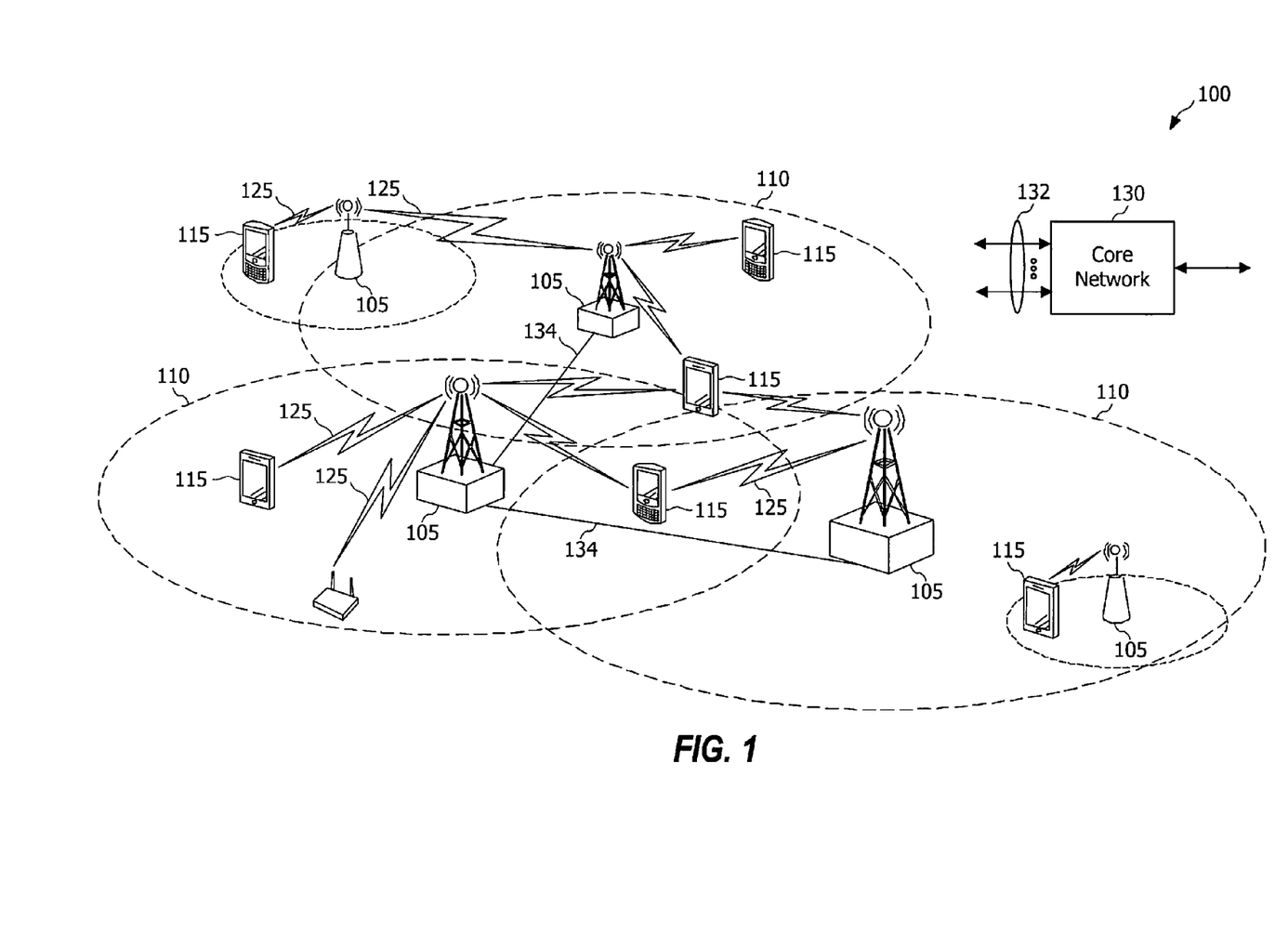
FIG. 1 is a block diagram illustrating details of a wireless communication system according to some embodiments.

FIG. 1 shows a wireless network 100 for communication, which may be an LTE-A network (other types of networks may also be utilized). The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. The term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. Synchronous networks may organize cells into zones, wherein a zone comprises a plurality of cells. The zones of a wireless network may allocate zone specific resources such that a UE may move freely throughout a zone using the same zone specific resources as it travels from one cell to another. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, watch, or the like. Regarding the Internet of Things (IoT), a UE may be referred to as a IoT UE which may be an appliance, thermostat, water meter, electric meter, gas meter, sprinkler system, refrigerator, hot water heater, oven, car, navigation system, pace maker, implanted medical device, location tracker, bicycle computer, entertainment device, television, monitor, vehicular component, vending machine, medical device, and the like. A UE may be able to communicate with macro eNBs, pico eNBs, femto eNBs, relays, and the like. In FIG. 1, a lightning bolt (e.g., communication links 125) indicates desired transmissions between a UE and a serving eNB, which is an eNB designated to serve the UE on the downlink and/or uplink, or desired transmission between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively. The devices illustrated in FIG. 1 are operable to carry out the techniques and operations disclosed herein.

As explained above, the growing demand for mobile broadband access has created an increase in communications between an eNB and a UE. Traditionally, all of the mobile originated (MO) data transmission steps are performed before each MO transmission, and every mobile terminated (MT) transmission step is performed before every MT transmission. Typically, all of the setup steps are repeated a multitude of times throughout an hour tying up a considerable about of network bandwidth and UE battery life. Further, because these steps are repeated for each transmission, the setup steps increase data latency. As such, it would be desirable to have systems and methods that allow for the reduction of the aforementioned steps and communications prior to MO and/or MT communications. That being said, there may be times when performing most or all of the aforementioned steps may be appropriate due to the type of data being sent, the mobility of the UE, and/or the status of the UE. Thus, it would be further desirable to have systems and methods operable to determine which steps and communications are appropriate given the circumstances and configure the UE to perform a reduced set of steps and communications when appropriate and perform a robust set of steps and communications when appropriate.

Figure 2:
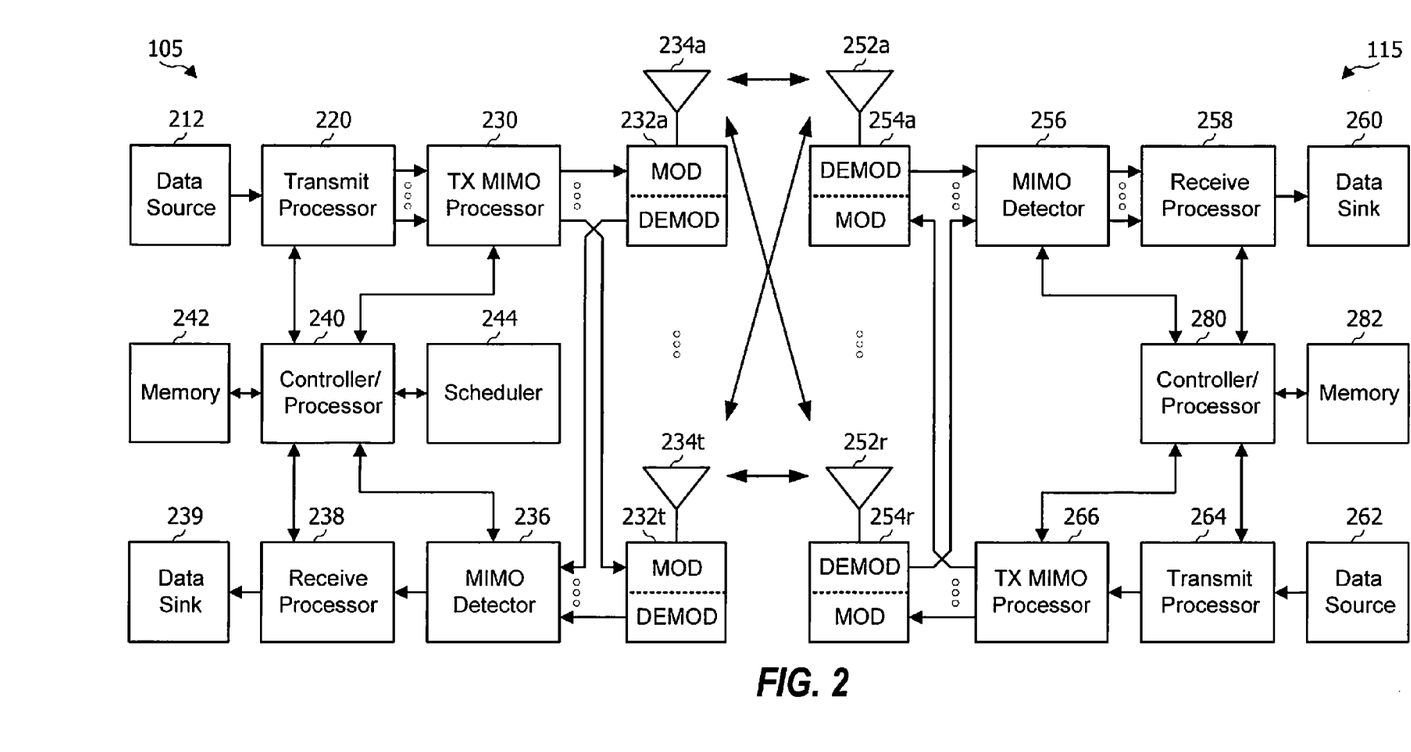
FIG. 2 is a block diagram conceptually illustrating a design of a base station/eNB and a UE configured according to some embodiments.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 3-6, and/or other processes for the techniques described herein. The memories 242 and 282 may store data and program codes for the eNB 105 and the UE 115, respectively. A scheduler 244 may schedule UEs for data transmission on the downlink and/or uplink.

Figure 3:
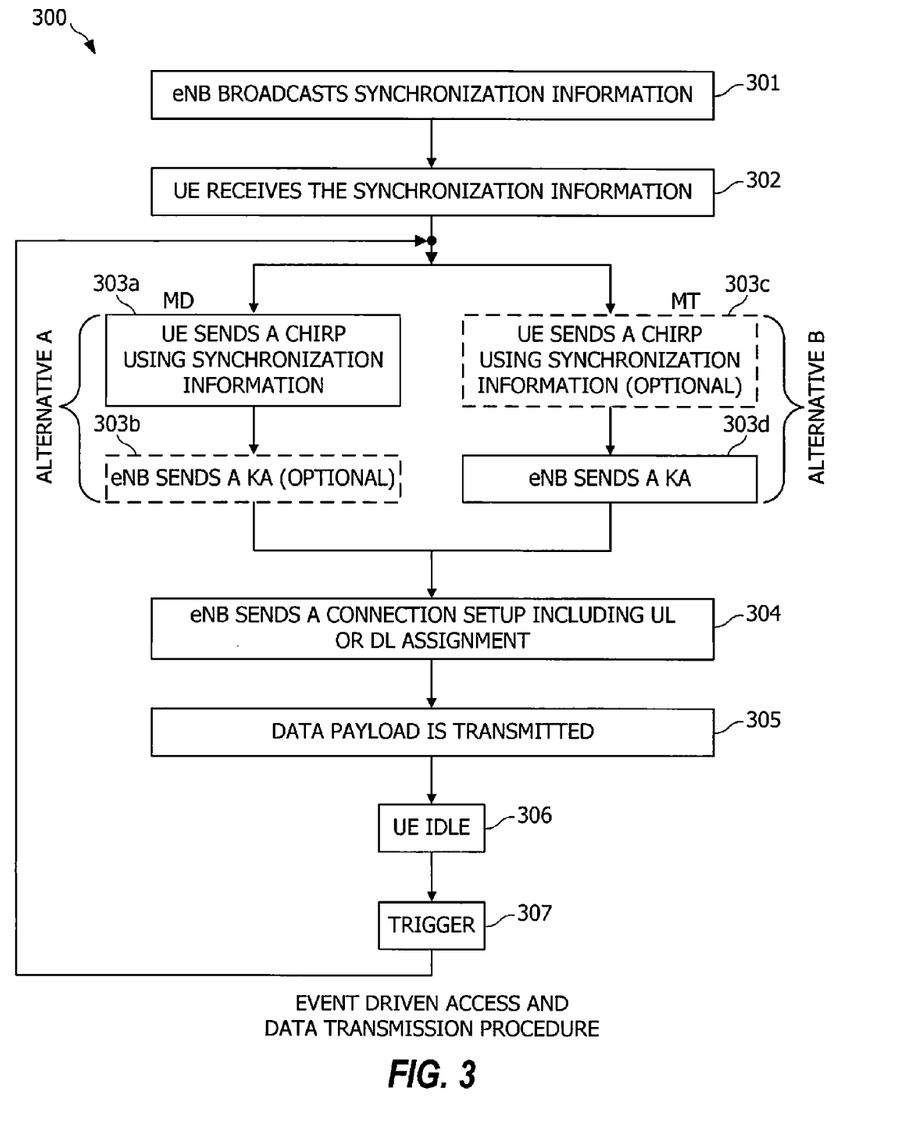
FIG. 3 is a flow diagram illustrating an example method of an Event Driven Access and Data Transmission Procedure according to some embodiments.

FIG. 3 shows an example flow diagram of method 300, which is an Event Driven Access and Data Transmission Procedure 300. In method 300, an event triggers performance of all the steps of the Event Driven Access and Data Transmission Procedure 300. An example triggering event is a scheduled reading report, wherein the UE is schedule to take a reading (e.g., temperature reading) and report the reading to the network. Upon taking the reading, the UE would perform method 300 in order to transmit the mobile originated (MO) data to the network. Another example triggering event is the reception of a Keep Alive (KA) message or a paging message from the eNB warning the UE that a data transmission will soon be sent to the UE. A KA is used to tell the UE to wake up and setup a connection with the eNB, for example, because the eNB is getting ready to send mobile terminated (MT) data to the UE. In embodiments, a KA may be as small as one bit.

In 301, an eNB broadcasts synchronization information, which may include but is not limited to, Primary Synchronization Signals (PSS), Secondary Synchronization Signals (SSS), downlink reference signals, Master Information Block (MIB), Physical Hybrid-ARQ Indicator Channel (PHICH) configuration, System Frame Number, QPSK modulation, cell-specific scrambling, basic network data, and the like. In 302, one or more UE receives the eNB broadcasted synchronization information. The eNB broadcasted synchronization information may be received directly from the eNB or from another device.

Upon a triggering event occurring, it is determined that communication between the UE and eNB is desired. If the triggered communication is to be MO, the method performs alternative A. Alternative A begins with 303a, wherein the UE sends a Chirp using at least a portion of the synchronization information, which may include the Random Access Channel Reference Signal (RACH-RS), the UE ID, Buffer Status Report, and/or the like. In embodiments, the eNB may not have network resources available at the time the Chirp is received. For example, the eNB may not have an UL channel available at the time the UE sends the Chirp. In such a circumstance, the eNB has the option to respond to the Chirp by sending a KA message to the UE indicting that the eNB is willing to receive the data but does not currently have the resources available (optional 303b). Upon network resources becoming available, the eNB may proceed to 304.

Alternatively, if the triggered communication is to be MT, the method performs alternative B. In alternative B, the UE has the option of sending a Chirp using at least a portion of the synchronization information, which may include the Random Access Channel Reference Signal (RACH-RS), the UE ID, Buffer Status Report, and/or the like. In 303d, the eNB sends a Keep Alive (KA) to the UE. After steps 303b or 303d (depending on which of the alternative routes were taken), the method moves to 304.

At 304, in response to the Chirp or KA, the eNB creates and sends a Connection Setup, which may include network information, such as but not limited to, a Cell ID, the UL or DL assignment, a Timing Advance (TA), a Modulation and Coding Scheme (MCS), Channel State Information (CSI), and/or the like. The UE may receive the Connection Setup directly from the eNB or from another device.

In 305 the data payload is send on the assigned UL or DL. In a MO example, the UE sends the data payload (e.g., a temperature reading) the eNB on the UL in 305. If a MT example, the eNB sends the data payload to the UE on the DL in 305.

After the initial data payload is transmitted in 305, the UE and eNB may maintain the connection so that additional data payloads may be communicated back and forth between the UE and eNB. Upon the UE and eNB ceasing to send data to each other for a period of time, 306 may transition the UE into an Idle state or Standby mode. In 307, another triggering event occurs, thereby causing all steps of the Event Driven Access and Transmission Data Procedure 300 to repeat again.

The Event Driven Access and Data Transmission Procedure of FIG. 3 can be repeated each and every time an event occurs, for example, when a data transfer is initiated. As such, while method 300 performs less steps as compared to traditional RAP, steps of this method may be repeated several times throughout a time period (e.g., minute, hours, day, and the like). Performing the steps of method 300 may consume a considerable amount of resources including time, battery life, and network traffic. When appropriate, it would be desirable to conserve the aforementioned resources by offering a method that allows one or more of the steps of FIG. 3 to be skipped for defined periods of time.

Figure 4:
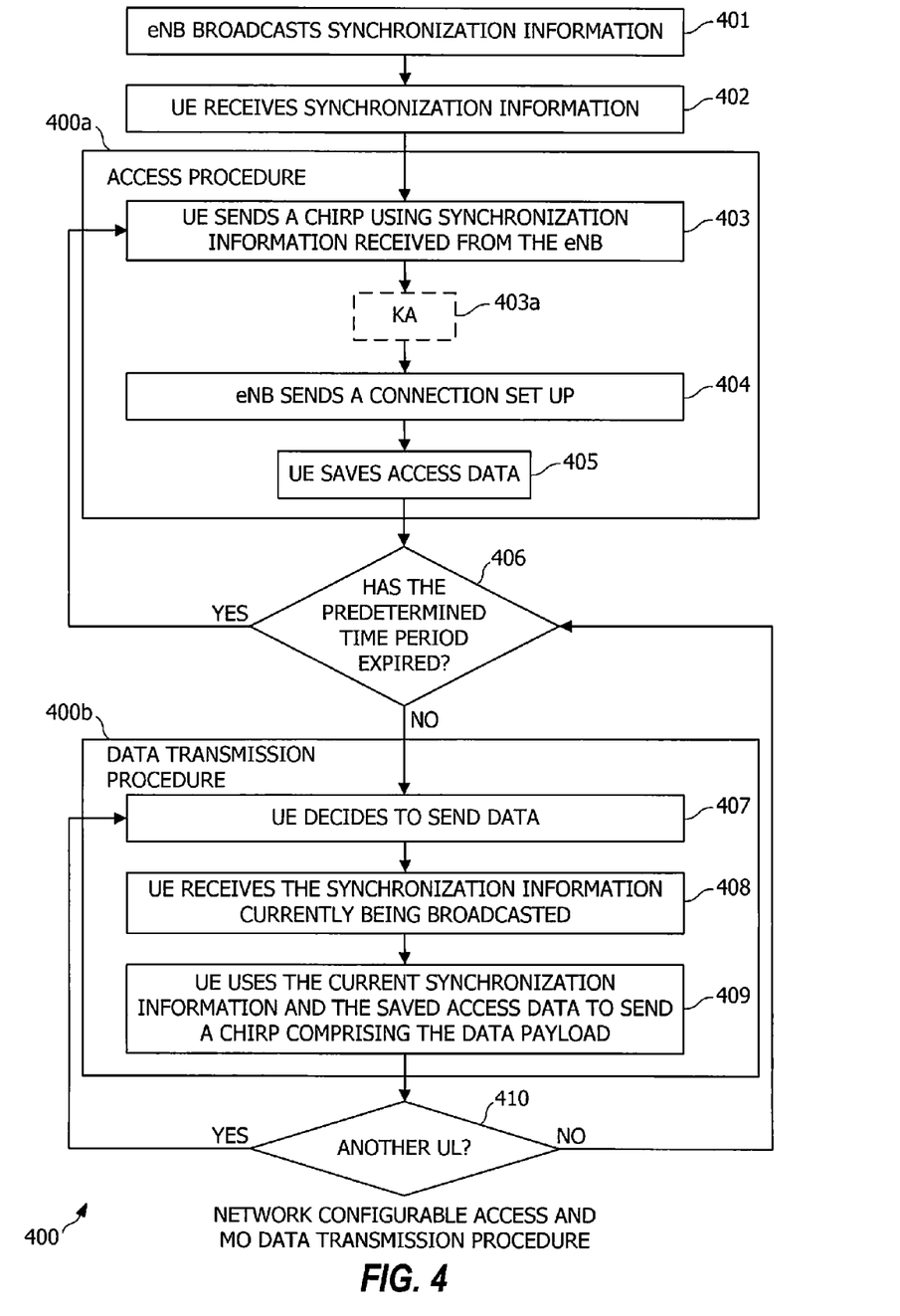
FIG. 4 is a flow diagram illustrating an example method of a Network Configurable Access and Data Transmission Procedure according to some embodiments.

FIG. 4 is an example Network Configurable Access and Data Transmission Procedure useful for mobile originated (MO) data transfers. It is generally designed to reduce the Access Procedure's frequency so some of method 300's actions may be skipped. Method 400 is split into two procedures: the Access Procedure 400a, which is performed once during a predetermined time period (e.g., once an hour, once a day, once a week, or the like) and the Data Transmission Procedure 400b, which is performed at the initiation of each data transfer. Thus, Access Procedure 400a is performed less frequently as compared to Data Transmission Procedure 400b. Further, according to Data Transmission Procedure 400b, multiple data transmission are conducted using and reusing access data saved during Access Procedure 400a until the predetermined time period expires. When the predetermined time period expires, the Access Procedure 400a is performed again to allow saved access data to be refreshed. As such, method 400 minimizes and/or eliminates the repeated expenditure of time, battery life, and data traffic involved in performing the steps of the Access Procedure 400a by minimizing its frequency. Further, the network determines whether the UE should be configured to operate according to the Event Driven Access and Data Transmission Procedure 300 or the Network Configurable Access and Data Transmission Procedure 400.

In 401, an eNB broadcasts synchronization information. Synch information may include but is not limited to, Primary Synchronization Signals (PSS), Secondary Synchronization Signals (SSS), downlink reference signals, Master Information Block (MIB), Physical Hybrid-ARQ Indicator Channel (PHICH) configuration, System Frame Number, QPSK modulation, cell-specific scrambling, basic network data, and the like. In 402, one or more UE receives the eNB broadcasted synchronization information. The eNB broadcasted synchronization information may be received directly from the eNB or from another device.

At 403, the UE initiates the Access Procedure 400a by sending a Chirp, which may include the UE ID, Buffer Status Report, Random Access Channel Reference Signal (RACH-RS), and/or the like. The eNB receives the Chirp either directly from the UE or from another device. In a Network Configurable Access and Data Transmission Procedure 400, the network configures when and if Access Procedure 400a is performed. For example, the network may configure the UE to initiate the Access Procedure 400a upon the UE powering up, upon the UE entering a new cell, upon the UE entering a new zone, upon the UE entering a new network, and/or upon the expiration of a predetermined period of time, x, which is set by the network. Methodology the network uses to set the predetermined time period will be discussed below with reference to FIG. 6.

In embodiments, the eNB may not have network resources available at the time the Chirp is received. For example, the eNB may not have an UL channel available at the time the UE sends the Chirp. In such a circumstance, the eNB has the option respond to the Chirp by sending a KA message to the UE indicting that the eNB is willing to receive the data but does not currently have the resources available (optional 403a). Upon network resources becoming available, the eNB may proceed to 404 wherein the eNB creates and sends the Connection Setup.

At 404, in response to receiving the Chirp, the eNB creates and sends a Connection Setup, which may include network information, such as but not limited to, a Cell ID, a Timing Advance (TA), a Modulation and Coding Scheme (MCS), Channel State Information (CSI), a UL assignment, and/or the like. SIB information may also be sent to the UE. In embodiments, the SIB information may be sent in a separate transmission subsequent to the transmission that included the Cell ID, TA, MCS, CSI, etc. The UE may receive the Connection Setup directly from the eNB or from another device.

In 405, the UE saves access data for future transmissions. Preferably, the saved access data is system, information that is unlikely to change for the predetermined period of time (e.g. an hour, a day, days, weeks, years, and the like) such as the Cell ID, the TA, the MCS, a resource configuration within the SIB, and/or the like. An uplink and downlink assignment is likely to change during the predetermined period of time, so the uplink and downlink assignment may be omitted from the saved access data. In some embodiments, such as UEs operating in a network that allocates zone specific resources and/or UEs sending small data, 405 may choose to exclude the TA from the saved access data. In these circumstances, the TA may be omitted from the saved access data because the TA may not be needed to transfer data at a later time. Steps 403-405 may be referred to as the UE's Access Procedure 400a, and the information saved during the Access Procedure 400a may be used by the UE at a later time to transmit data to the eNB.

As explained above, the network configures when and if the Access Procedure 400a is performed. If the network has configured the Access Procedure 400a to be performed upon expiration of a predetermined period of time, x, then at 406, the predetermined period of time begins. As explained above, the saved access data is saved for future use, and is unlikely to change during the predetermined period of time. As such, the predetermined period of time, x, is set to match the expected life span of the saved access data. For example, if the access data is expected to become stale after an hour, then x is set to one hour or less. If the access data is expected to become stale after a day, x is set to one day or less. The network is free to configure x to be any value and preferably is set to match the expected life span of the saved access data.

406 monitors whether the predetermined period of time has expired. At the expiration of the predetermined period of time, the method moves to 401 and the Access Procedure 400a is repeated in order to refresh the saved access data. Prior to the predetermined period of time expiring, the UE may perform any number of operations including but not limited to transitioning into an Idle state or Standby mode.

Among the aforementioned operations the UE may perform, one or more Data Transmission Procedure 400b may be performed before the expiration of the predetermined period of time. At 407, the UE decides to send data to the network, which initiates the Data Transmission Procedure 400b. While the Data Transmission Procedure 400b may be used to send several different types of data, small data is particularly suitable for transmission via Data Transmission Procedure 400b. Small data is a data packet that is comparatively smaller in size than a typical data packet. For example, small data may be limited to 1-300 bits while a typical data packet may range in size from 300-1000 s of bits. Because the small data has comparatively less bits than traditional data, small data may include a comparatively smaller payload and a comparatively smaller overhead. For example, small data may be limited to the small data payload and UE ID. Because small data is comparatively smaller than typical data packets, collisions and data loss are of less concern. Thus, small data may safely be treated differently from typical data packets. Further, small data may involve a data packet that the UE desires to send but to which no connection setup is desired. For example, small data may be time sensitive readings of the UE that are scheduled to be reported to the eNB, but to which no eNB response, other than an ACK/NACK response, is desired. In a more specific example, the UE may be configured to send a water meter reading every hour, but other than an ACK/NACK, desires no response from the network regarding the water meter reading. Because the UE desires no response, a two way connection between the UE and eNB is not necessary at the time the small data is sent. As such, it is desirable for the UE to send small data to the eNB without expending time or battery life establishing a two way connection, for example the two way connection required for a voice call or to browse the internet.

The Data Transmission Procedure 400b, e.g., steps 407-410, sends data (e.g., small data) more quickly and efficiently as compared a traditional uplink of data sent in a two way communication between the UE and eNB. In embodiments, the Data Transmission Procedure 400b may be performed substantially more often than the Access Procedure 400a. For example, the UE may be configured to take interval readings (e.g., in 15 minute intervals, 30 minute intervals, hourly, and the like) and/or take readings in response to an event (e.g., when a door opens, when a light is turned on or off, when a TV or radio channel is changed) and report the readings using the Data Transmission Procedure 400b while in comparison, the Access Procedure 400a is only performed after expiration of an extended period of time (e.g., a day, days, a week, weeks, and the like).

In 407, the UE decides to send a data transmission. The method then moves to 408, which is similar to 402. In 408, the UE receives the synchronization information that the eNB is broadcasting at that time. The synchronization information may include but is not limited to, Primary Synchronization Signals (PSS), Secondary Synchronization Signals (SSS), downlink reference signals, Master Information Block (MIB), Physical Hybrid-ARQ Indicator Channel (PH-ICH) configuration, System Frame Number, QPSK modulation, cell-specific scrambling, basic network data, frame boundary, and/or the like.

In 409, the data is transmitted. The UE uses the current synchronization information and at least a portion of the saved access information to send an I-Chirp comprising the data payload to the eNB. Preferably, the I-Chirp is small data including the data payload and UE-ID. If the UE decides to send another transmission before the predetermined time period expires, steps 407-409 are repeated without repeating Access Procedure 400a. Further, once 406 determines the predetermined period of time has expired, the method returns to 403 and the Access Procedure 400a is repeated in order to refresh the saves access data.

Optionally, the eNB may generate and send an ACK/NACK message in response to the I-Chirp. If this option is exercised, then upon receiving a NACK, the UE may repeat 409, until an ACK is received, until a NACK time period has expired, and/or until a threshold number of attempts have been made.

As explained, Data Transmission Procedure 400b may be repeated several times using some or all of the access data previously saved during 405. Traditionally, a Random Access Procedure and two way connection setup is performed every time a data transmission is desired. Thus, the traditional procedure consumes substantial time, battery life, and data traffic performing multiple Random Access Procedures throughout the day. Method 400 performs its Access Procedure 400a once during a predetermined time period (e.g., once an hour, once a day, once a week, or the like) and reuses the access data saved from the previously performed Access Procedure 400a for each Data Transmission Procedure 400b performed during that predetermined time period. Thus, method 400 minimizes and/or prevents the repeated consumption of time, battery life, and data traffic during that time period.

Figure 5:
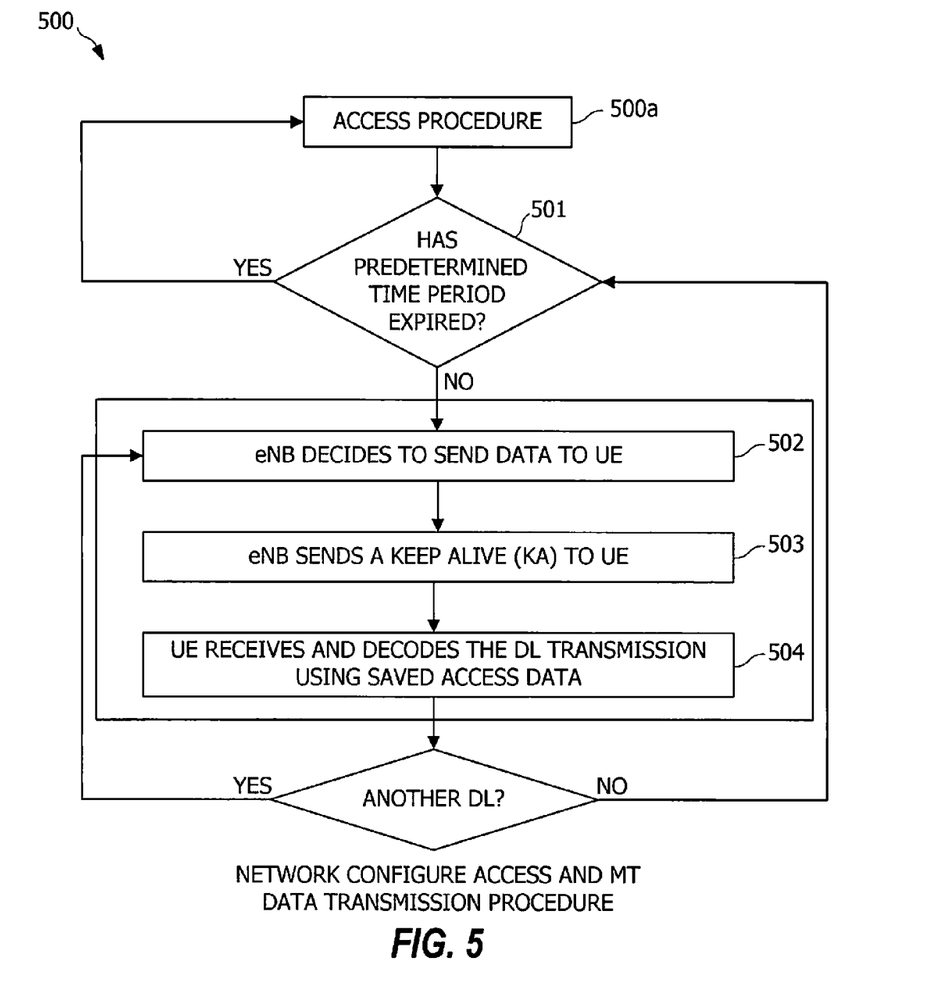
FIG. 5 is a flow diagram illustrating another example of a Network Configurable Access and Data Transmission Procedure according to some embodiments.

FIG. 5 is an example Network Configurable Access and Data Transmission Procedure useful for mobile terminated (MT) data transfers, which is designed to reduce the Access Procedure's 500a frequency thereby allowing several of the steps to be omitted when appropriate. Method 500 is split into two procedures: the Access Procedure 500a, which is performed once during a predetermined time period (e.g., once a minute, once an hour, once a day, once a week, or the like) and the Data Transmission Procedure 500b, wherein multiple data transmissions are conducted using and reusing access data saved during Access Procedure 500a until the predetermined time period expires. When the predetermined time period expires, the Access Procedure 500a is performed again to refresh the saved access data. As such, method 500 minimizes and/or eliminates the repeated expenditure of time, battery life, and data traffic involved in the steps of the Access Procedure 500a by minimizing its frequency. Further, the network determines whether the UE should be configured to operate according to the Event Driven Access and Data Transmission Procedure 300 or the Network Configurable Access and Data Transmission Procedure 500.

In method 500, the Access Procedure 500a performs the same steps as those disclosed in Access Procedure 400a. Further, in 501, the method 500 monitors whether the predetermined period of time has expired. At the expiration of the predetermined period of time, the method repeats Access Procedure 500a. Prior to the predetermined period of time expiring, the UE may perform any number of operations including by not limited to transitioning into an Idle state or Standby mode.

Among the aforementioned operations the UE may perform before the expiration of the predetermined period of time is Data Transmission Procedure 500b. At 502, the eNB decides to send data to the UE, which initiates Data Transmission Procedure 500b.

In 503, the eNB sends a Keep Alive (KA) message to the UE alerting the UE that a downlink (DL) transmission will soon be sent. The eNB may wait for Chirp or KA occasion before sending the KA message in 503. In 504, the UE listens for the DL transmission. Upon receiving the DL transmission, the UE decodes the DL transmission at least using some or all of the access data saved during the Access Procedure 500a such as the cell ID.

Data Transmission Procedure 500b may be repeated several times prior to expiration of the predetermined time period using at least some or all of the access data saved during Access Procedure 500a. Traditionally, a Random Access Procedure and two way connection setup is performed every time the eNB decides to send a data transmission. Thus, the traditional procedure consumes substantial time, battery life, and data traffic performing multiple Random Access Procedures throughout the day. Method 500 performs its Access Procedure 500a once during a predetermined time period (e.g., once a minute, once an hour, once a day, once a week, or the like) and reuses the access data saved from the previously performed Access Procedure 500a for each Data Transmission Procedure 500b performed during that predetermined time period. Thus, method 500 minimizes and/or prevents the repeated consumption of time, battery life, and data traffic during that time period.

Figure 6:
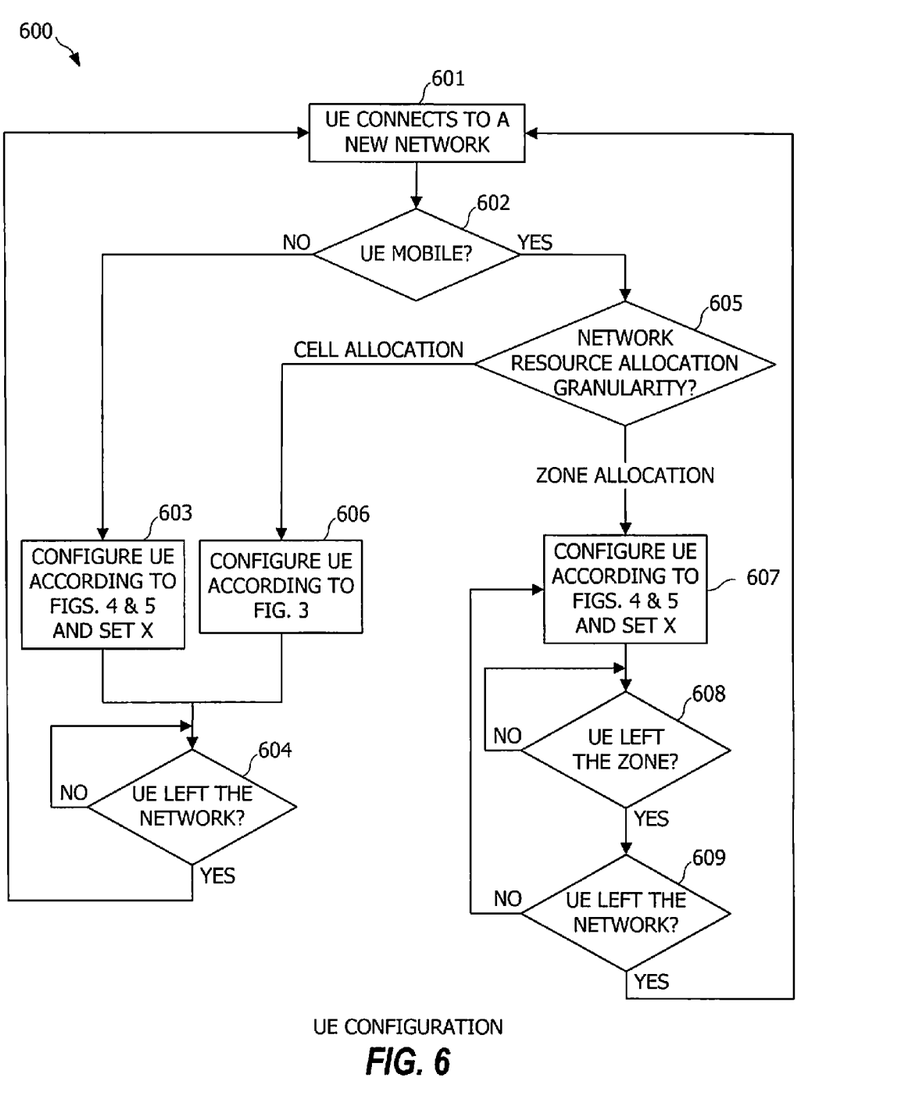
FIG. 6 is a flow diagram illustrating a method which configures the Access and Data Transmission Procedures for a UE according to some embodiments.

FIGS. 3-5 illustrate various methods for data transmission. As mentioned above, the network determines whether at any particular time one or more particular UEs should be configured to operate according to the Event Driven Access and Data Transmission Procedure 300 or the Network Configurable Access and Data Transmission Procedures 400 and 500. FIG. 6 shows an example flow diagram of method 600, wherein the network determines which configuration is appropriate for a particular UE at a particular time and then configures the manner in which the UE will send Mobile Originated (MO) data transmissions and receive Mobile Terminated (MT) data transmissions based on that determination.

In 601, a UE comes into communication with a new wireless communication network. In examples, the UE may be powered on or otherwise move into an area covered by a different communication network. In 602, the method determines whether the UE is a mobile UE or a non-mobile UE. If the UE is determined to be a non-mobile UE, the method moves to 603, wherein the UE is configured to perform data transmissions according to the methods disclosed in FIGS. 4 and 5. Further, 603 sets the predetermine period of time, x. Because the UE is a non-mobile device, the saved access data of Access Procedures 400a and 500a is expected to have a long life span. Thus, x is set to be a high value thereby minimizing the number of time the Access Procedure 400a or 500a is performed. For example, x may be set as high as 24 hours, 48 hours, once a week, or the like. In 603, the network has the option of configuring the UE to ignore Timing Advances (TA) and/or MCS when sending data transmissions. If desired, the network may configure the UE to ignore TA and/or MCS contingent on the type of data being transferred (e.g., TA may be ignored when transmitting small data). The UE remains in this configuration until the UE leaves the serving network (604) and connects to a new network (601).

If 602 determines that the UE is a mobile UE, the method moves to 605, wherein the system determines the allocation granularity of the network resources. For example, some networks allocate cell specific resources and other networks allocate zone specific resources. In a network that allocates cell specific resources, assigned resources of a first cell are not used when communicating with a second cell. For example, each cell would send a UE a different SIB. In contrast, in a network that allocates zone specific resources, a plurality of cells share resource allocations. As such, zone specific resources are shared by a plurality of cells such that zone allocated resources can be used by a UE to communicate with any or a plurality of the cells within the zone. For example, the UE could communicate with a first cell and a second cell using the same SIB information.

If 605 determines that the network allocates cell specific resources, the method moves to 606, wherein the UE is configured to perform data transmissions according to the method disclosed in FIG. 3. The UE remains in this configuration until the UE leaves the serving network (604) and connects to a new network (601).

If 605 determines that the network allocates zone specific resources, the method moves to 607, wherein the UE is configured to perform data transmissions according to the methods disclosed in FIGS. 4 and 5. Further, 607 sets the predetermine period of time, x. Because the UE is a mobile device, the saved access data of Access Procedures 400a and 500a is expected to have a life span that is shorter as compared to a non-mobile device. Further, the system may set the predetermined time period, x, of Access Procedure 400a to be different from the predetermined time period, x, of Access Procedure 500a. Again, the system sets x according to the expected life span of the saved access data. The saved access data of Access Procedure 400a may have a longer expected life span than that of the saved access data of Access Procedure 500a, for example because systems desire that MT data have less latency. Thus, in embodiments, x of Access Procedure 400a may be set at a moderately high value such as 1 hour, 12 hours, 18 hours, or the like while x of Access Procedure 500*a* may be set at seconds, minutes or the like. Thus, x is set to a value that balances latency expectations with the minimization of the number of times the Access Procedure 400*a* or 500*a* is performed. In 608, the network has the option of configuring the UE to ignore TA and/or MCS when sending data transmissions. If desired, the network may configure the UE to ignore TA and/or MCS contingent on the type of data being transferred (e.g., TA may be ignored when transmitting small data). The UE remains in this configuration until the UE leaves the serving zone (608). Upon the UE leaving the serving zone, the system determines whether the UE left the serving network (609). If the UE remains in the serving network after leaving the serving zone, the system configures the UE to perform to FIGS. 4 and 5 and set x in light of the new serving zone's resource allocations (607). If, in 609, the UE left the serving network and connects to a new network (601), the system moves to 602. A UE may be configured and reconfigured multiple times as it moves from one zone and/or network to another.

In an alternative embodiment to FIG. 6, a UE may be preconfigured, wherein the access information (e.g., SIB) is preconfigured and stored in the UE. When the UE is preconfigured with saved access data, the Access Procedure 400*a* and 500*a* may be skipped because the UE already has the access data stored therein. For example, the UE may be preconfigured with SIB information that is compatible with the network to which it is expected to communicate. An example UE is a thermostat, which is expected to be installed at a particular location (e.g., address). Because the access data useful to communicate with the network serving that UE at that particular location will be know prior to installation, the thermostat may be preconfigured with the known access information (e.g. SIB). In such an embodiment, the thermostat may skip Access Procedures 400*a* and 400*b* and simply send and receive data using the preconfigured access data and Data Transmission Procedures 400*b* and 500*b*.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3-6 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for transmitting data comprising: receiving and saving at least a portion of UE access data;
   utilizing at least a portion of the saved UE access data to send more than one data transmission;
   determining that a predetermined time period associated with the saved UE access data has expired; and
   based on the determining, refreshing the saved UE access data at least by:
   receiving, from a network, synchronization information,
   based at least on a portion of the synchronization information, sending a Chirp requesting refreshed UE access data,
   upon the UE access data being changed, in response to the Chirp, receiving the refreshed UE access data, and
   saving the refreshed UE access data, wherein the saved refreshed UE access data becomes the saved UE access data upon being saved.

2. The method of claim 1 further comprising: utilizing the saved UE access data to decode downlink transmission data.

3. The method of claim 2 wherein the decoding decodes the downlink transmission data of a plurality of downlink transmissions before the saved access data is refreshed.

4. The method of claim 1 wherein the one or more data transmission is a small data transmission.

5. The method of claim 1 wherein the predetermined time period is set by a network.

6. The method of claim 1 wherein the predetermined time period is set by a UE.

7. The method of claim 1 wherein a UE determines the predetermined time period has expired.

8. The method of claim 1 wherein a network determines the predetermined time period has expired.

9. The method of claim 1 wherein the saved UE access data comprises at least one of:
   a Cell ID;
   a UL or DL assignment;
   a Modulation and Coding Scheme (MCS); and Channel State Information (CSI).

10. A method for transmitting data of claim 1 further comprising:
    receiving and saving at least a portion of UE access data:
    utilizing at least a portion of the saved UE access data to send more than one data transmission;
    determining that a predetermined time period associated with the saved UE access data has expired;
    based on the determining, refreshing the saved UE access data: and configuring the UE, comprising:
    determining whether the UE is mobile,
    determining a resource allocation granularity of a network serving the UE, and
    based at least on the mobility determination and the resource allocation granularity determination, setting the predetermined time period.

11. The method of claim 10 wherein the configuring initiates upon the UE entering a new network.

12. A UE for transmitting data comprising:
    a processor configured to receive UE access data;
    a memory configured to save at least a portion of the UE access data; and
    the processor further configured to utilize at least a portion of the saved UE access data to send more than one data transmission, wherein the processor is further configured to determine that a predetermined time period associated with the saved UE access data has expired, and based on the determination, the processor is further configured to refresh the saved UE access data, wherein the processor is further configured to receive synchronization information and based at least on a portion of the synchronization information, send a Chirp requesting refreshed UE access data, wherein upon the UE access data being changed in response to the Chirp, the processor is further configured to receive the refreshed UE access data and save the refreshed UE access data in the memory, wherein the saved refreshed UE access data becomes the saved UE access data upon being saved.

13. The UE of claim 12 wherein the processor is further configured to utilize the saved UE access data to decode a received communication.

14. The UE of claim 13 wherein the processor decodes a plurality of downlink transmissions before the saved access data is refreshed.

15. The UE of 12 wherein the one or more data transmission is a small data transmission.

16. The UE of claim 12 wherein the predetermined time period is set by a network.

17. The UE of claim 12 wherein the saved UE access data comprises at least one of:
    a Cell ID;
    a UL or DL assignment; a Modulation and Coding Scheme (MCS); and Channel State Information (CSI).

18. A UE for transmitting data comprising:
    a processor configured to receive UE access data;
    a memory configured to save at least a portion of the UE access data: and
    the processor further configured to utilize at least a portion of the saved UE access data to send more than one data transmission, wherein the processor is further configured to determine that a predetermined time period associated with the saved UE access data has expired, and based on the determination, the processor is further configured to refresh the saved UE access data, wherein the processor is further configured to determine whether the UE is mobile, determine a resource allocation granularity of a network serving the UE, and based at least on the mobility determination and the resource allocation granularity determination, the processor is configured to determine the predetermined time period and configure the UE according to the determined predetermined time period.

19. The UE of claim 18 wherein the processor initiates the configuration upon the UE entering a new network.

20. A non-transitory computer-readable medium having program code recorded thereon, the program code comprising:
- program code for causing a UE to receive and save at least a portion of UE access data;
- program code for causing the UE to utilize at least a portion of the saved UE access data to send more than one data transmission;
- program code for causing the UE to determine that a predetermined time period associated with the saved UE access data has expired; and
- program code for causing the UE to refresh the saved UE access data based on the determining comprising:
  - program code for causing the UE to receive synchronization information,
  - program code for causing the UE to send, based at least on a portion of the synchronization information, a Chirp requesting refreshed UE access data,
  - program code for causing the UE to receive, upon the UE access data being changed and in response to the Chirp, the refreshed UE access data, and
  - program code for causing the UE to save the refreshed UE access data, wherein the saved refreshed UE access data becomes the saved UE access data upon being saved.

21. The non-transitory computer-readable medium of claim 20 having program code recorded thereon, the program code comprising:
- program code for causing the UE to utilize the saved UE access data to decode downlink transmission data.

22. The non-transitory computer-readable medium of claim 21, wherein the decoding decodes a plurality of downlink transmissions before the saved access data is refreshed.

23. The non-transitory computer-readable medium of claim 20, wherein the one or more data transmission is a small data transmission.

24. The non-transitory computer-readable medium of claim 20, wherein the saved UE access data comprises at least one of:
- a Cell ID;
- a UL or DL assignment; a Modulation and Coding Scheme (MCS); and Channel State Information (CSI).

25. A non-transitory computer-readable medium having program code recorded thereon, the program code comprising:
- program code for causing a UE to receive and save at least a portion of UE access data;
- program code for causing the UE to utilize at least a portion of the saved UE access data to send more than one data transmission;
- program code for causing the UE to determine that a predetermined time period associated with the saved UE access data has expired;
- program code for causing the UE to refresh the saved UE access data based on the determining; and
- program code for causing the UE to configuring the UE, comprising:
  - program code for causing the UE to determine whether the UE is mobile,
  - program code for causing the UE to determine a resource allocation granularity of a network serving the UE, and
  - program code for causing the UE to set the predetermined time period based at least on the mobility determination and the resource allocation granularity determination.

26. The non-transitory computer-readable medium of claim 25, wherein the configuring initiates upon the UE entering a new network.

* * * * *

UNITED STATES PATENT AND TRADEMARK OFFICE
CERTIFICATE OF CORRECTION

PATENT NO.         : 9,814,050 B2
APPLICATION NO.    : 15/089412
DATED              : November 7, 2017
INVENTOR(S)        : Saurabha Tavildar et al.

Page 1 of 1

It is certified that error appears in the above-identified patent and that said Letters Patent is hereby corrected as shown below:

In the Claims

At Column 19, Claim number 10, Line number 66, delete "A method for transmitting data of claim 1 further comprising:" and replace with --A method for transmitting data comprising:--.

At Column 20, Claim number 10, Line number 1, delete "receiving and saving at least a portion of UE access data:" and replace with --receiving and saving at least a portion of UE access data;--.

At Column 20, Claim number 10, starting at Line number 6, delete "based on the determining, refreshing the saved UE access data:" and replace with --based on the determining, refreshing the saved UE access data;--.

At Column 20, Claim number 18, starting at Line number 54, delete "a memory configured to save at least a portion of the UE access data:" and replace with --a memory configured to save at least a portion of the UE access data;--.

Signed and Sealed this
Sixth Day of March, 2018

Andrei Iancu
*Director of the United States Patent and Trademark Office*